(12) United States Patent
Zhang et al.

(10) Patent No.: US 12,170,098 B2
(45) Date of Patent: Dec. 17, 2024

(54) SOUND DETECTION METHOD

(71) Applicant: Alibaba Damo (Hangzhou) Technology Co., Ltd., Zhejiang (CN)

(72) Inventors: Shiliang Zhang, Hangzhou (CN); Siqi Zheng, Hangzhou (CN); Weilong Huang, Hangzhou (CN)

(73) Assignee: Alibaba Damo (Hangzhou) Technology Co., Ltd., Hangzhou (CN)

( * ) Notice: Subject to any disclaimer, the term of this patent is extended or adjusted under 35 U.S.C. 154(b) by 295 days.

(21) Appl. No.: 17/822,731

(22) Filed: Aug. 26, 2022

(65) Prior Publication Data

US 2023/0074906 A1 Mar. 9, 2023

(30) Foreign Application Priority Data

Sep. 3, 2021 (CN) .......................... 202111029142.7

(51) Int. Cl.
*G10L 25/87* (2013.01)
*G10L 15/02* (2006.01)
*G10L 15/06* (2013.01)

(52) U.S. Cl.
CPC .............. *G10L 25/87* (2013.01); *G10L 15/02* (2013.01); *G10L 15/063* (2013.01)

(58) Field of Classification Search
CPC ......... G10L 25/87; G10L 25/00; G10L 25/03; G10L 25/27; G10L 25/30; G10L 25/51;
(Continued)

(56) References Cited

U.S. PATENT DOCUMENTS 11,495,210 B2* 11/2022 Li .......................... G10L 15/18
2017/0169828 A1* 6/2017 Sachdev ................. G10L 25/93
(Continued)

FOREIGN PATENT DOCUMENTS

CN 109243484 A 1/2019
CN 110021302 A 7/2019
(Continued)

OTHER PUBLICATIONS

First Search Report issued in corresponding Chinese Application No. 202111029142.7 on Sep. 28, 2021 (1 page).

*Primary Examiner* — Qi Han
(74) *Attorney, Agent, or Firm* — Finnegan, Henderson, Farabow, Garrett & Dunner, LLP

(57) ABSTRACT

The present disclosure discloses a sound detection method. The method includes: obtaining an initial sound signal and a spatial distribution spectrum of the initial sound signal; segmenting the initial sound signal, to obtain a target sound segment, and obtaining a timestamp corresponding to the target sound segment, the target sound segment including a speech of at least one object, and the timestamp being used for indicating a start time of the target sound segment and an end time of the target sound segment; segmenting the spatial distribution spectrum by using the timestamp, to obtain a spatial distribution spectrum segment corresponding to the target sound segment; and inputting the target sound segment and the spatial distribution spectrum segment into a sound detection model, to obtain a first sound detection result, the first sound detection result being used for describing whether sound of multiple objects exists in the initial sound signal.

20 Claims, 9 Drawing Sheets

(58) Field of Classification Search
CPC ......... G10L 25/78; G10L 25/81; G10L 25/84; G10L 25/93; G10L 25/935; G10L 15/04; G10L 15/06; G10L 15/00; G10L 15/02; G10L 15/005; G10L 15/063; G10L 15/065; G10L 15/07; G10L 15/08; G10L 15/16; G10L 15/20; G10L 15/24; G10L 15/26; G10L 17/00; G10L 17/02; G10L 17/04; G10L 17/08; G10L 17/12; G10L 17/20; G10L 17/26
USPC ....... 704/250, 245, 248, 249, 252, 253, 254, 704/255, 257, 276
See application file for complete search history.

(56) References Cited

U.S. PATENT DOCUMENTS

| | | | | |
|---|---|---|---|---|
| 2019/0139543 | A1* | 5/2019 | Rahmel | G10L 15/22 |
| 2019/0156835 | A1* | 5/2019 | Church | G10L 15/30 |
| 2020/0349953 | A1 | 11/2020 | Qin et al. | |
| 2023/0005495 | A1* | 1/2023 | Kukde | G10L 25/93 |

FOREIGN PATENT DOCUMENTS

| | | |
|---|---|---|
| CN | 110310642 A | 10/2019 |
| CN | 110797043 A | 2/2020 |

* cited by examiner

SOUND DETECTION METHOD

CROSS-REFERENCE TO RELATED APPLICATIONS

The present application claims priority to and the benefits of Chinese Patent Application Serial No. 202111029142.7, filed on Sep. 3, 2021, entitled "SOUND DETECTION METHOD," which is incorporated herein by reference in its entirety.

TECHNICAL FIELD

The present disclosure relates to the field of sound detection, and in particular, to a sound detection method.

BACKGROUND

Currently, a speech recognition system may recognize a speech in a scene and convert the speech into a text form. However, there are often scenarios where multiple people speak, that is, overlapping speech may occur in the scene. The overlapping speech will bring great challenges to subsequent operations such as speaker diarization and speech recognition. Existing speech recognition systems cannot precisely identify the scenario where multiple people speak. Generally, the overlapping speech needs to be first obtained by using an overlapping speech detection technology, and then speakers are separated by using a speech separation technology, so that speech recognition can be performed by using a common speech recognition system. However, a currently existing problem is that the accuracy of the overlapping speech detection technology is relatively low.

For the foregoing problem, no effective solution has been provided yet.

SUMMARY

Embodiments of the present disclosure provide a sound detection method, to resolve at least a technical problem of relatively low accuracy of overlapping speech detection.

According to one aspect of embodiments of the present disclosure, a sound detection method is provided, the sound detection method including: obtaining an initial sound signal and a spatial distribution spectrum of the initial sound signal; segmenting the initial sound signal, to obtain a target sound segment, and obtaining a timestamp corresponding to the target sound segment, in which the target sound segment includes a speech of at least one object, and the timestamp is used for indicating a start time of the target sound segment and an end time of the target sound segment; segmenting the spatial distribution spectrum by using the timestamp, to obtain a spatial distribution spectrum segment corresponding to the target sound segment; and inputting the target sound segment and the spatial distribution spectrum segment into a sound detection model, to obtain a first sound detection result, in which the first sound detection result is used for describing whether sound of multiple objects exists in the initial sound signal.

According to another aspect of embodiments of the present disclosure, a sound detection method is further provided, the sound detection method including: displaying an audio and video interaction interface in a conference interface; obtaining an initial sound signal and a spatial distribution spectrum of the initial sound signal in response to the audio and video interaction interface sensing a detection instruction; segmenting the initial sound signal, to obtain a target sound segment, and obtaining a timestamp corresponding to the target sound segment, in which the target sound segment includes a speech of at least one object, and the timestamp is used for indicating a start time of the target sound segment and an end time of the target sound segment; segmenting the spatial distribution spectrum by using the timestamp of the target sound segment, to obtain a spatial distribution spectrum segment corresponding to the target sound segment; and displaying a first sound detection result in the audio and video interaction interface, in which the first sound detection result is a result obtained by inputting the target sound segment and the spatial distribution spectrum segment into a sound detection model, and the first sound detection result is used for describing whether sound of multiple objects exists in the initial sound signal.

According to another aspect of embodiments of the present disclosure, a sound detection method is further provided, the sound detection method including: triggering a teaching interaction function in a teaching interface, and obtaining an initial sound signal and a spatial distribution spectrum of the initial sound signal generated during teaching; segmenting the initial sound signal in response to the teaching interface sensing a detection instruction, to obtain a target sound segment, and obtaining a timestamp corresponding to the target sound segment, in which the target sound segment includes a speech of at least one object, and the timestamp is used for indicating a start time of the target sound segment and an end time of the target sound segment; segmenting the spatial distribution spectrum by using the timestamp of the target sound segment, to obtain a spatial distribution spectrum segment corresponding to the target sound segment; and displaying a first sound detection result in the teaching interface, in which the first sound detection result is a result obtained by inputting the target sound segment and the spatial distribution spectrum segment into a sound detection model, and the first sound detection result is used for describing whether sound of multiple objects exists in the initial sound signal.

Embodiments of the present disclosure provide a sound detection system. The sound detection system includes: a memory configured to store computer instructions; and one or more processors configured to execute the computer instructions to cause the sound detection system to perform the sound detection method mentioned above.

Embodiments of the present disclosure provide a non-transitory computer-readable storage medium that stores one or more programs executable by one or more processors to cause a device to perform the sound detection method mentioned above.

BRIEF DESCRIPTION OF THE DRAWINGS

The accompanying drawings described herein are intended to provide further understanding of the present disclosure and constitute a part of this application. Exemplary embodiments of the present disclosure and the description thereof are used for explaining the present disclosure rather than constituting the improper limitation to the present disclosure. In the accompanying drawings.

DETAILED DESCRIPTION

Figure 1:
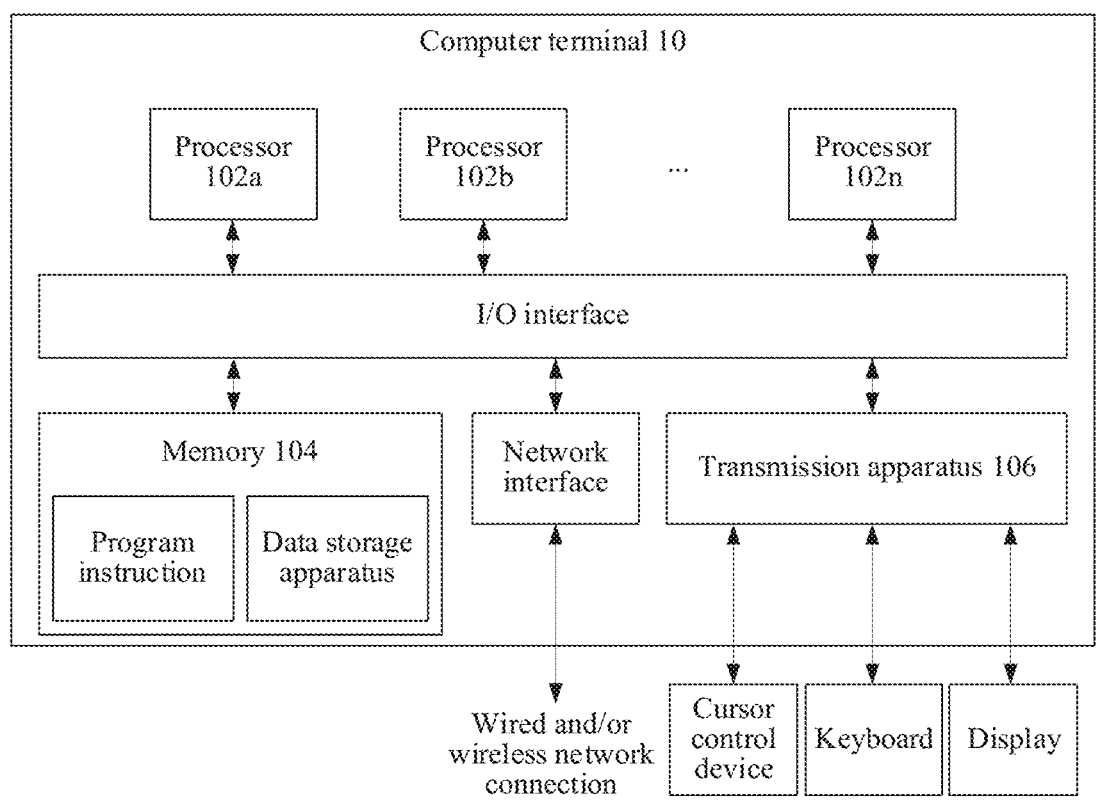
FIG. 1 is a structural block diagram of hardware of a computer terminal of a sound detection method according to some embodiments of the present disclosure.

In order to enable those skilled in the art to better understand the present disclosure, the technical solutions in embodiments of the present disclosure will be clearly and fully described in combination with the drawings of the embodiments of the present disclosure. It is obvious that the described embodiments are only a part of but not all embodiments of the present disclosure. All other embodiments obtained by a person of ordinary skill in the art based on the embodiments of the present disclosure shall fall within the protection scope of the present disclosure.

It should be noted that the terms such as "original" and "second" in the specification, claims, and drawings of the present disclosure are intended to distinguish between similar items, but not to indicate a specific order or sequence. It should be understood that data used in this way is exchangeable in a proper case, so that the embodiments of the present disclosure described herein can be implemented in an order different from the order shown or described herein. Moreover, the terms "include", "contain", and any other variants thereof mean to cover the non-exclusive inclusion. For example, a process, method, system, product, or device that includes a list of steps or units is not necessarily limited to those steps or units that are clearly listed, but may include other steps or units not expressly listed or inherent to such a process, method, system, product, or device.

In the embodiments of the present disclosure, an initial sound signal and a spatial distribution spectrum of the initial sound signal are first obtained. Then, the initial sound signal is segmented, to obtain a target sound segment and obtain a timestamp corresponding to the target sound segment. The target sound segment includes a speech of at least one object, and the timestamp is used for indicating a start time of the target sound segment and an end time of the target sound segment. The spatial distribution spectrum is segmented by using the timestamp, to obtain a spatial distribution spectrum segment corresponding to the target sound segment. The target sound segment and the spatial distribution spectrum segment are inputted into a sound detection model, to obtain a first sound detection result. The first sound detection result is used for describing whether sound of multiple objects exists in the initial sound signal, to improve accuracy of overlapping speech detection in the initial sound signal by using the spatial distribution spectrum of the initial sound signal. In the present disclosure, the term "overlapping speech detection" refers to a sound detection technology for a case that multiple objects exist in a sound signal.

It is noted that, by segmenting the initial sound signal to obtain the target sound segment, the spatial distribution spectrum segment corresponding to the target sound segment may be obtained. Whether the overlapping speech exists in the target sound segment can be more precisely detected by combining the spatial distribution spectrum segment. If it is detected by using the sound detection model that the overlapping speech exists in the target sound segment, the overlapping speech may be processed to obtain a speech of each object in the overlapping speech.

Therefore, the solution provided in this disclosure resolves the technical problem of relatively low accuracy of overlapping speech detection.

Currently, audio and video conferencing is a new application scenario unlocked by the intelligent speech technology to date. A relatively large demand for the audio and video conference is to obtain highly readable conference minutes. An existing common speech recognition system completes only a conversion task. However, the audio and video conference scenario usually includes multiple conference attendees, so that the highly readable conference minutes cannot be done by simply transcribing to text, but the transcription needs to be performed according to roles. This process faces more challenges, including, first, how to distinguish speakers well, and, second, how to deal with overlapping speech.

However, in a conference scenario, multiple speakers make about 10% of the speech simultaneously, which cannot be handled well by using the existing speech recognition system. In order to resolve the foregoing problems, this disclosure provides the following solutions.

According to some embodiments of the present disclosure, an example of a sound detection method is provided. It should be noted that, steps shown in flowcharts of the accompanying drawings may be performed in a computer system such as a group of computer executable instructions. In addition, although logic sequences are shown in the flowcharts, in some cases, the shown or described steps may be performed in sequences different from those herein.

The described methods of this disclosure may be executed in a mobile terminal, a computer terminal, or a similar computing apparatus. FIG. 1 is a block diagram of an example hardware structure of a computer terminal for a sound detection method according to some embodiments of the present disclosure. As shown in FIG. 1, a computer terminal 10 may include one or more processors (e.g., in example FIG. 1, more than two processors 102a-102n are shown and may include but are not limited to processing apparatuses such as microprocessors, e.g., microcontroller unit (MCU) or programmable logical devices, e.g., Field Programmable Gate Array (FPGA)), a memory 104 configured to store data, and a transmission module 106 configured to perform a communication function. A person of ordinary skill in the art may understand that the structure shown in FIG. 1 is only for the purpose of illustration, and does not limit to the structure of the foregoing electronic apparatus. For example, the computer terminal 10 may also include more or fewer components than those shown in FIG. 1, or have a configuration different from that shown in FIG. 1.

The memory 104 may be configured to store a software program and module of application software, such as a program instruction/module corresponding to the sound detection method in the embodiments of the present disclosure. The processors 102a-102n run the software program and module stored in the memory 104, so as to execute various function applications and data processing, that is, implement the foregoing sound detection method of the application. The memory 104 may include a high-speed random-access memory, and may also include a nonvolatile memory, for example, one or more magnetic storage devices, flash memories or other nonvolatile solid-state memories. In some examples, the memory 104 may further include memories remotely disposed relative to the processors 102a-102n, and these remote memories may be connected to the computer terminal 10 through a network. Examples of the network include, but are not limited to, the Internet, an intranet, a local area network, a mobile communication network, and a combination thereof.

The transmission apparatus 106 is configured to receive or send data through a network. An example of the foregoing network may include a wireless network provided by a communication provider of the computer terminal 10. In an example, the transmission apparatus 106 includes a network interface controller (NIC), which may be connected to another network device through a base station so as to communicate with the Internet. In some embodiments, the transmission apparatus 106 may be a radio frequency (RF) module, which is configured to communicate with the Internet in a wireless manner.

The display may be a touch screen type liquid crystal display (LCD), and the LCD enables the user to interact with a user interface of the computer terminal 10 (or the mobile device).

It should be noted herein that, in some optional embodiments, the computer device (or the mobile device) shown in FIG. 1 may include hardware elements (including a circuit), software elements (including computer code stored on a transitory or non-transitory computer-readable medium), or a combination of the hardware elements and the software elements. It should be pointed out that, FIG. 1 is merely one example of specific instances, and aims to show types of components existing in the foregoing computer device (or the mobile device).

Figure 2:
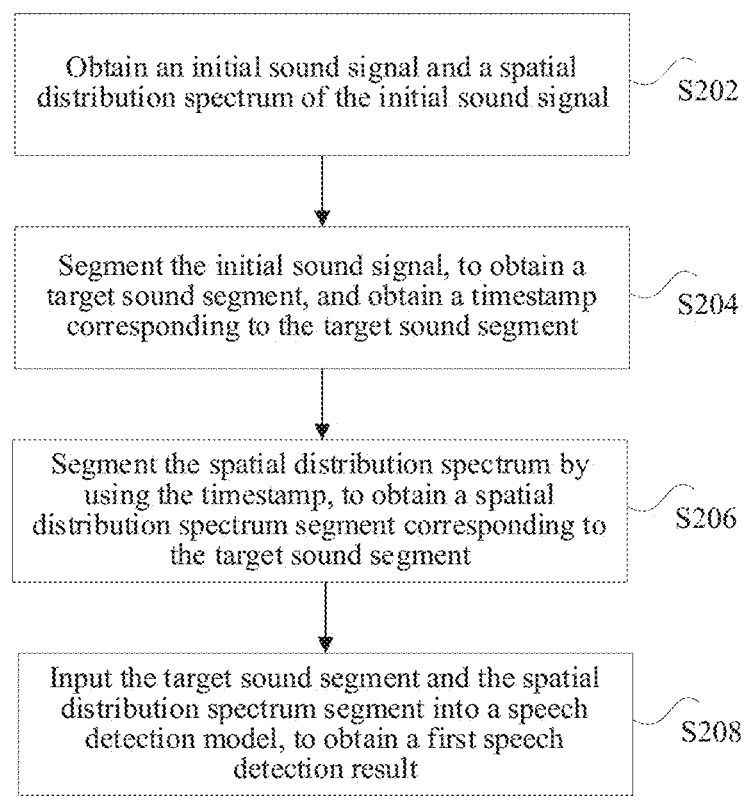
FIG. 2 is a flowchart of a sound detection method according to some embodiments of the present disclosure.

In the foregoing operating environment, this present disclosure provides a sound detection method shown in FIG. 2. FIG. 2 is a flowchart of a sound detection method according to some embodiments of the present disclosure. As shown in FIG. 2, the method may include the following steps S202, S204, S206, and S208.

In step S202, an initial sound signal and a spatial distribution spectrum of the initial sound signal are obtained.

The aforementioned initial sound signal may be a to-be-processed multi-channel sound signal or may be a to-be-processed single-channel sound signal. The multi-channel sound signal may be obtained by using multiple sound collection apparatuses, while the single-channel sound signal may be obtained by using a single sound collection apparatus. The sound collection apparatuses may form a microphone including a microphone array. The single sound collection apparatus may form a microphone.

The aforementioned spatial distribution spectrum of the initial sound signal may be a distribution of the initial sound signal in a space.

In some embodiments, an initial sound signal may be obtained from the sound collection apparatus, and then a distribution of the initial sound signal in a space is determined by using a sound source positioning technology, to obtain a spatial distribution spectrum of the initial sound signal.

The aforementioned initial sound signal may be a sound signal acquired from a conference scenario. The spatial distribution spectrum of the initial sound signal may be a distribution of the sound signal in a conference room.

The aforementioned initial sound signal may be a sound signal acquired from an educational scenario. The spatial distribution spectrum of the initial sound signal may be a distribution of the sound signal in the educational scenario.

In step S204, the initial sound signal is segmented, to obtain a target sound segment, and obtain a timestamp corresponding to the target sound segment.

The target sound segment includes a speech of at least one object, and the timestamp is used for indicating a start time of the target sound segment and an end time of the target sound segment.

In some embodiments, the initial sound signal may be segmented by using a pre-trained partitioning model, to obtain a target sound segment. The partitioning model may be a neural network-based voice activity detection (NN-VAD) model.

In some embodiments, the initial sound signal may include sound signals of various types, for example, a voice signal, a noise signal, and environmental sound. The initial sound signal may be segmented according to a timestamp of the initial sound signal. Specifically, it may be detected whether a speech of at least one object exists in each time period of the initial sound signal. If the speech of the at least one object exists in a time period, a start time and an end time of the time period are obtained, and the initial sound signal is segmented according to the start time and the end time, to obtain a target sound segment.

The aforementioned timestamp may be a start time point of the target sound segment and an end time point of the target sound segment.

For example, if an initial sound signal lasts for a total of 10 minutes and a speech of at least one object exists from the third minute to the sixth minute, a timestamp corresponding to a target sound segment that needs to be segmented is the third minute and the sixth minute. In this case, the initial sound signal may be segmented to obtain a sound signal from the third minute to the sixth minute, so as to obtain the target sound segment including the speech of the at least one object.

The object may be any entity that is capable of outputting a speech in the scenario. The entity may be a person or may be a device.

In some embodiments, a sound segment including a speech of at least one object in the initial sound signal may be first obtained, and a start time and an end time of the sound segment are determined. Then, the initial sound signal is segmented according to the start time and the end time of the sound segment, to obtain a target sound segment, and a start time and an end time corresponding to the target sound segment, that is, a timestamp corresponding to the target sound segment.

In yet some other embodiments, a sound segment without a speech of an object in the initial sound signal may be first obtained, and a start time and an end time of the sound segment are determined. Then, the initial sound signal is segmented according to the start time and the end time of the sound segment, to obtain the sound segment without the speech of the object, and the sound segment without the speech of the object is discarded. Because the sound segment without the speech of the object in the initial sound signal has been discarded, a remaining sound segment is a sound segment including the speech of the object. In this case, the remaining sound segment may be obtained as a target sound segment. After the target sound segment is obtained, a timestamp of the target sound segment may be obtained, so that the spatial distribution spectrum of the initial sound signal is segmented by using the timestamp.

In step S206, the spatial distribution spectrum is segmented by using the timestamp, to obtain a spatial distribution spectrum segment corresponding to the target sound segment.

In some embodiments, the target sound segment includes a speech of at least one object. The spatial distribution spectrum corresponding to the initial sound signal may be segmented by using the start time and the end time of the target sound segment, to obtain a spatial distribution spectrum segment corresponding to the target sound segment. It should be noted that the start time and the end time of the target sound segment is the same as a start time and an end time of the spatial distribution spectrum segment.

In some other embodiments, a spatial distribution feature of the at least one object in the target sound segment is displayed in the spatial distribution spectrum segment. In this disclosure, spatial distribution feature refers to a distribution of a speech signal in a space. If the target sound segment includes sound of multiple objects, spatial distribution features of the multiple objects are displayed in the spatial distribution spectrum segment.

In step S208, the target sound segment and the spatial distribution spectrum segment are inputted into a sound detection model, to obtain a first sound detection result.

The first sound detection result is used for describing whether sound of multiple objects exists in the initial sound signal.

In some embodiments, the target sound segment and the spatial distribution spectrum segment may be inputted into a sound detection model, to detect whether the target sound segment includes sound of multiple objects, that is, whether the overlapping speech exists in the target sound segment.

In some other embodiments, a speech in the target sound segment is detected in combination with the spatial distribution spectrum, and a first sound detection result of the overlapping speech may be effectively improved. If the first sound detection result indicates that the overlapping speech exists in the target sound segment, the speech recognition can be performed after processing the overlapping speech, to obtain speech information of each object. If the first sound detection result indicates that the overlapping speech does not exist in the target sound segment, the target sound segment may be directly recognized, to obtain speech information of the objects included in the target sound segment.

In a conference scenario, if conference minutes in a text form need to be obtained according to speeches of conference attendees, it may be determined, according to a first sound detection result, whether multiple conference attendees make speeches simultaneously in a target sound segment. If the conference attendees make the speeches simultaneously, the target sound segment may be processed to obtain a speech of each conference attendee, and the speech of each conference attendee is converted to a text form to obtain the conference minutes of the current conference. If it is determined, according to the first sound detection result, that conference attendees do not make the speeches simultaneously in the target sound segment, the speeches of the conference attendees in the target sound segment may be directly recognized, and the speeches of the conference attendees are converted to a text form, to obtain the conference minutes of the current conference.

In this example of the present disclosure, after displaying the first sound detection result, the method further includes: separating the sound of the multiple objects in the initial sound signal in response to that the first sound detection result indicating that the sound of the multiple objects exists in the initial sound signal, to obtain an independent sound signal of each of the objects.

In some embodiments, in response to that the first sound detection result indicates that the sound of the multiple objects exists in the initial sound signal, it indicates that the overlapping speech exists in the initial sound signal. In this case, sound of the multiple objects in the initial sound signal may be separated, to obtain an independent sound signal of each of the objects, so that the independent sound signal of each of the objects is converted, to obtain a text form of the independent sound signal of each of the objects.

In some other embodiments, the sound of the multiple objects in the initial sound signal may be separated by using a preset separation model. The sound of the multiple objects in the initial sound signal may be separated in another manner, and the separation manner is not limited herein.

Through the aforementioned steps, an initial sound signal and a spatial distribution spectrum of the initial sound signal are first obtained, the initial sound signal is then segmented, to obtain a target sound segment, and a timestamp corresponding to the target sound segment. The target sound segment includes a speech of at least one object, and the timestamp is used for indicating a start time of the target sound segment and an end time of the target sound segment. The spatial distribution spectrum is segmented by using the timestamp, to obtain a spatial distribution spectrum segment corresponding to the target sound segment. The target sound segment and the spatial distribution spectrum segment are inputted into a sound detection model, to obtain a first sound detection result, where the first sound detection result is used for describing whether sound of multiple objects exists in the initial sound signal, to improve accuracy of overlapping speech detection in the initial sound signal by using the spatial distribution spectrum of the initial sound signal.

It is noted that, by segmenting the initial sound signal to obtain the target sound segment, the spatial distribution spectrum segment corresponding to the target sound segment may be obtained, and whether overlapping speeches exist in the target sound segment can be more precisely detected by combining the spatial distribution spectrum segment. If it is detected by using the sound detection model that the overlapping speech exists in the target sound segment, the overlapping speech may be processed, to obtain a speech of each object in the overlapping speech.

Therefore, the solution provided in the present disclosure resolves the technical problem of relatively low accuracy of overlapping speech detection.

In some embodiments of the present disclosure, the obtaining the initial sound signal and the spatial distribution spectrum of the initial sound signal includes: obtaining the initial sound signal; and positioning the initial sound signal by using a sound source positioning module, to generate the spatial distribution spectrum of the initial sound signal.

In some embodiments, the initial sound signal may be a multi-channel sound signal. In this case, after the initial sound signal is obtained, a sound signal of each channel may be positioned by using the sound source positioning module, to generate the spatial distribution spectrum of the initial sound signal. The spatial distribution spectrum includes the spatial distribution feature of the sound signal of each channel, and the position of the sound signal of each channel in the space may be determined according to the spatial distribution feature.

In some other embodiments, the aforementioned initial sound signal may be a single-channel sound signal. In this case, after the initial sound signal is obtained, the sound signal of the channel may be positioned by using the sound source positioning module, to generate the spatial distribution spectrum of the initial sound signal. The spatial distribution spectrum includes the spatial distribution feature of the sound signal of the channel, and the position of the sound signal of the channel in the space may be determined according to the spatial distribution feature.

In some embodiments of the present disclosure, the segmenting the initial sound signal, to obtain the target sound segment includes: processing the initial sound signal by using the spatial distribution spectrum, to obtain a target sound signal; and segmenting the target sound signal, to obtain the target sound segment.

In some embodiments, after the initial sound signal and the spatial distribution spectrum corresponding to the initial sound signal are obtained, a sound signal of each channel in the initial sound signal may be processed according to the spatial distribution spectrum. Specifically, because the spatial distribution feature of the sound signal of each channel exists in the spatial distribution spectrum, the sound signal of each channel distributed in the space may be enhanced in a targeted manner according to the spatial distribution spectrum, to obtain an enhanced sound signal, and the sound signal is used as a target sound signal. After the target sound signal is obtained, the target sound signal may be segmented, to obtain a target sound segment.

In some embodiments of the present disclosure, the processing the initial sound signal by using the spatial distribution spectrum, to obtain a target sound signal includes: processing the initial sound signal by using a sound enhancement module, to obtain an enhanced initial sound signal; and processing the enhanced initial sound signal by using the spatial distribution spectrum, to obtain the target sound signal.

The sound enhancement module may be a beam forming module. The beam forming module mainly suppresses noise and an interference direction in the initial sound signal and enhances the signal in a target direction. When the initial sound signal is a single-channel sound signal, the single-channel sound signal may be enhanced according to the direction of the single channel. When the initial sound signal is a multi-channel sound signal, the multi-channel sound signal may be enhanced according to directions of multiple channels.

In some embodiments, after the initial sound signal is enhanced by using the sound enhancement module, an enhanced initial sound signal may be obtained. Further, the enhanced initial sound signal may be further enhanced by using the spatial distribution spectrum, to obtain the target signal with a relatively strong signal strength.

In some embodiments of the present disclosure, the method further includes: obtaining the sound detection model through training. The obtaining the sound detection model through training includes: obtaining a first sample and a second sample, where the first sample is a sample sound segment, and the second sample is a sample spatial distribution spectrum segment corresponding to the sample sound segment; and training an initial model by using the first sample and the second sample, to obtain the sound detection model.

In some embodiments, the sample sound segment may be obtained as the first sample, and whether overlapping speech exists in the sample sound segment is marked. If the overlapping speech exists in the sample sound segment, the sample sound segment is marked as 1. If the overlapping speech does not exist in the sample sound segment, the sample sound segment is marked as 0. When the sample sound segment is marked as 1, a sample spatial distribution spectrum segment corresponding to the sample sound segment is marked as 1. When the sample sound segment is marked as 0, the sample spatial distribution spectrum segment corresponding to the sample sound segment is marked as 0.

Further, the initial model may be trained according to the first sample, the mark of the first sample, the second sample, and the mark of the second sample, to obtain the sound detection model.

The aforementioned initial model may be a neural network model.

In some other embodiments, before each time the sound detection is performed, a previous sound detection model can be used as the initial model for training, to obtain a trained sound detection model, so that a more accurate sound detection model can be used to detect whether the sound of the multiple objects exists in the initial sound signal.

In yet some other embodiments, the initial model may be trained only once, to obtain the sound detection model. Alternatively, the initial model may be trained as required. The number of times for training the initial model is not limited herein.

In some embodiments of the present disclosure, the training the initial model by using the first sample and the second sample, to obtain the sound detection model includes: inputting the first sample into a first feature extraction network, to obtain a sample sound feature vector; inputting the second sample into a second feature extraction network, to obtain a sample spatial distribution feature vector; fusing the sample sound feature vector and the sample spatial distribution feature vector, to obtain a first target feature vector; and training the initial model by using the first target feature vector, to obtain the sound detection model.

In some embodiments, the first sample and the mark of the first sample may be inputted into a first feature extraction network, to extract a sound feature in the first sample, so as to obtain a sample sound feature vector. The second sample and the mark of the second sample may be inputted into a second feature extraction network, to extract a spatial distribution feature in the second sample, so as to obtain a sample spatial distribution feature vector. Then, the sample sound feature vector and the sample spatial distribution feature vector may be fused, to obtain a first target feature vector. Finally, the initial model is trained by using the first target feature vector, to obtain the sound detection model.

In some other embodiments, after the first target feature vector is obtained, the first target feature vector may be inputted into a multi-layer fully connected network and a prediction network, to train the initial model.

The first feature extraction network and the second feature extraction network may be convolutional neural networks.

In some embodiments of the present disclosure, the method further includes: segmenting the initial sound signal by using the timestamp of the target sound segment, to obtain an initial sound segment; and inputting the target sound segment, the initial sound segment, and the spatial distribution spectrum segment into the sound detection model, to obtain a second sound detection result, where the second sound detection result is used for describing whether multiple objects exist in the initial sound signal.

In some embodiments, the initial sound signal may be segmented by using the timestamp of the target sound segment, and the target sound segment, the initial sound segment, and the spatial distribution spectrum segment are inputted into the sound detection model, so that a missing part in the target sound segment is complemented by using the initial sound segment, to obtain an accurate second sound detection result. It should be noted that the target sound segment is a sound segment obtained after multi-layer processing. Therefore, a part of sound information in the target sound segment may be partially missing. The initial sound segment is inputted into the sound detection model, and the missing part of the information may be complemented, to obtain a more accurate second sound detection result.

In some other embodiments, the target sound segment and the initial sound segment may be inputted into the sound detection model, to obtain a third sound detection result, where the third sound detection result is used for describing whether the multiple objects exist in the initial sound signal.

It should be noted that a user may select and input any two of the target sound segment, the initial sound segment, or the spatial distribution spectrum segment as required into the sound detection model.

In some embodiments of the present disclosure, the training the initial model by using the first sample and the second sample, to obtain the sound detection model includes: obtaining a third sample, where the third sample is a sample initial sound segment corresponding to the sample sound segment; and training the initial model by using the first sample, the second sample, and the third sample, to obtain the sound detection model.

In some embodiments, the sample initial sound segment may be obtained as the third sample, and whether overlapping speech exist in the sample initial sound segment is marked according to the sample sound segment. In response to the overlapping speech existing in the sample sound segment, the sample initial sound segment may be marked as 1. In response to the overlapping speech not existing in the sample sound segment, the sample initial sound segment may be marked as 0.

Further, the initial model may be trained according to the first sample, the mark of the first sample, the second sample, the mark of the second sample, the third sample, and the mark of the third sample, to obtain the sound detection model.

In some embodiments of the present disclosure, the training the initial model by using the first target feature vector, to obtain the sound detection model includes: inputting the third sample into a third feature extraction network, to obtain a sample initial sound feature vector; fusing the first target feature vector and the sample initial sound feature vector, to obtain a second target feature vector; and training the initial model by using the second target feature vector, to obtain the sound detection model.

In some embodiments, the third sample may be inputted into a third feature extraction network, to extract an initial sound feature in the third sample, so as to obtain a sample initial sound feature vector. Then, the first target feature vector and the sample initial sound feature vector may be fused, to obtain the second target feature vector. Finally, the initial model may be trained by using the second target feature vector, to obtain the sound detection model. The obtained sound detection model may output a sound detection result according to the inputted target sound segment, spatial distribution spectrum segment, and initial sound segment, to determine whether the overlapping speech exists in the initial sound signal, so that in response to the overlapping speech existing in the initial sound signal being detected, the initial sound signal is processed, to determine a speech of each object in the overlapping speech, and recognize the speech of each object. In response to detecting that the overlapping speech does not exist in the initial sound signal, the speech of the object in the initial sound signal may be directly recognized.

Figure 3:
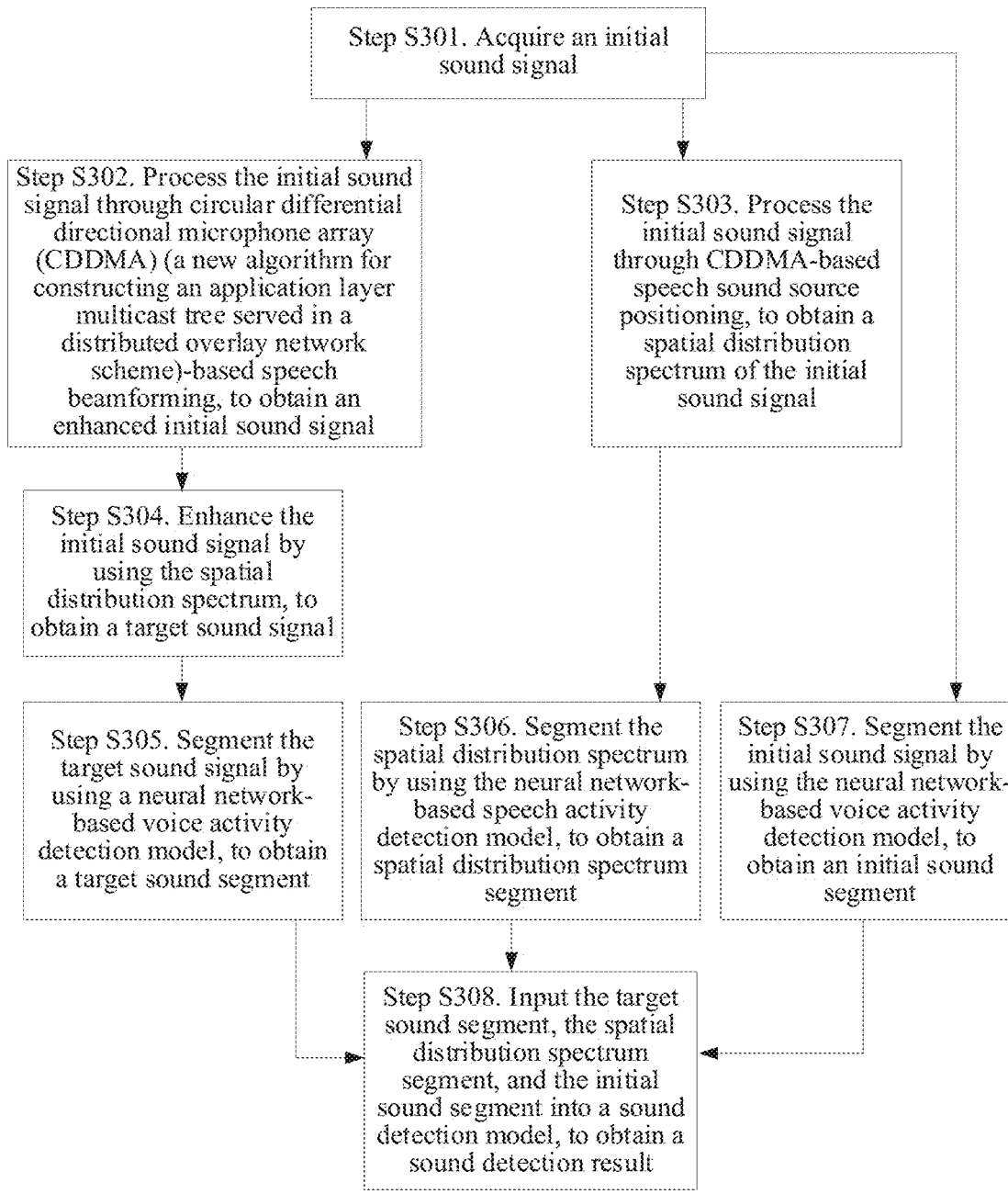
FIG. 3 is a flowchart of another sound detection method according to some embodiments of the present disclosure.
Figure 4:
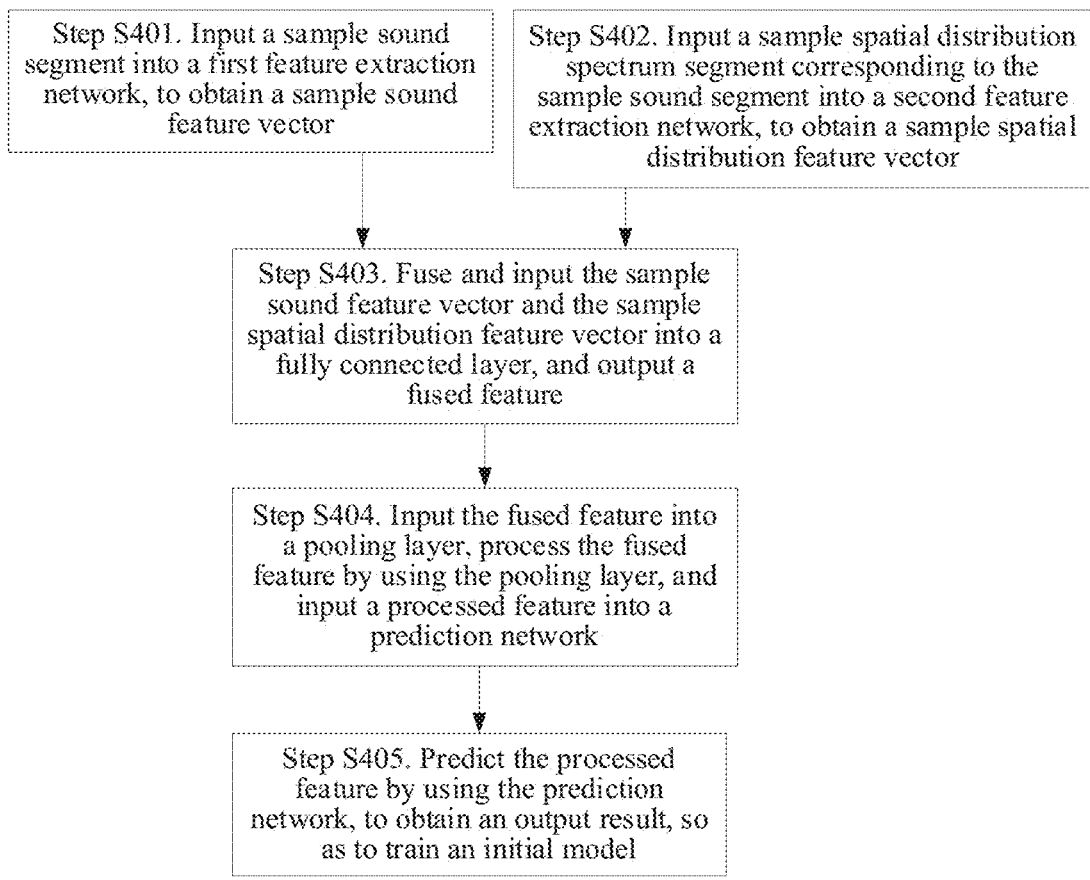
FIG. 4 is a flowchart of a method for training a sound detection model according to some embodiments of the present disclosure.

The following describes some exemplary embodiments of the present disclosure in detail with reference to FIG. 3 and FIG. 4. The method may be performed by a mobile terminal or a server. In some embodiments of the present disclosure, a description is made using an example in which the method is performed by the server.

In step S301, an initial sound signal is acquired.

The initial sound signal may be an array signal. The array signal may be obtained from multiple channels. The array signal may be represented by $CH_1, CH_2, CH_3, \ldots,$ and $CH_n$.

In step S302, the initial sound signal is processed through circular differential directional microphone array (CDDMA)-based speech beamforming, to obtain an enhanced initial sound signal. CDDMA is a new algorithm for constructing an application layer multicast tree served in a distributed overlay network scheme.

The enhanced initial sound signal may be a multi-beam sound signal.

In step S303, the initial sound signal is processed through CDDMA-based sound source positioning, to obtain a spatial distribution spectrum of the initial sound signal.

In step S304, the initial sound signal is enhanced by using the spatial distribution spectrum, to obtain a target sound signal.

In step S305, the target sound signal is segmented by using a neural network-based voice activity detection module, to obtain a target sound segment.

In step S306, the spatial distribution spectrum is segmented by using the neural network-based voice activity detection module, to obtain a spatial distribution spectrum segment.

In step S307, the initial sound signal is segmented by using the neural network-based voice activity detection module, to obtain an initial sound segment.

In step S308, the target sound segment, the spatial distribution spectrum segment, and the initial sound segment are inputted into a sound detection model, to obtain a sound detection result.

FIG. 4 shows a method for training a sound detection model. The method includes the following steps S401-S405.

In step S401, a sample sound segment is inputted into a first feature extraction network, to obtain a sample sound feature vector.

Specifically, the sample sound feature vector may be extracted by using a fully connected layer in the first feature extraction network.

In step S402, a sample spatial distribution spectrum segment corresponding to the sample sound segment is inputted into a second feature extraction network, to obtain a sample spatial distribution feature vector.

Specifically, the sample spatial distribution feature vector may be extracted by using a fully connected layer in the second feature extraction network.

In step S403, the sample sound feature vector and the sample spatial distribution feature vector are fuses and inputted into a fully connected layer, and a fused feature is outputted.

In step S404, the fused feature is inputted into a pooling layer, the fused feature is processed by using the pooling layer, and a processed feature is inputted into a prediction network.

In step S405, a prediction to the processed feature is performed by using the prediction network, to obtain an output result, so as to complete the training of the initial model.

It should be noted that for brief description, the foregoing method embodiments are described as a series of action combinations. However, a person skilled in the art is to appreciate that the present disclosure is not limited to the described order of the actions, because according to the present disclosure, some steps may be performed in other orders or simultaneously. In addition, a person skilled in the art is further to understand that the embodiments described in this specification are all exemplary embodiments, and the involved actions and modules are not necessarily required by the present disclosure.

According to the descriptions in the foregoing implementations, a person skilled in the art can clearly understand that the method according to the foregoing embodiments may be implemented by software plus a necessary universal hardware platform, or by using hardware, but in many cases, the former is a preferred implementation. Based on such understanding, the technical solutions of the present disclosure essentially, or the part contributing to the prior art, may be presented in the form of a software product. The computer software product is stored in a storage medium (e.g., a ROM/RAM, a magnetic disk, or an optical disc) including several instructions to enable a terminal device (which may be a mobile phone, a computer, a server, a network device, or the like) to perform the methods described in the embodiments of the present disclosure.

According to some embodiments of the present disclosure, an example of a sound detection method is further provided. It should be noted that, steps shown in flowcharts of the accompanying drawings may be performed in a computer system such as a group of computer executable instructions. In addition, although logic sequences are shown in the flowcharts, in some cases, the shown or described steps may be performed in sequences different from those herein.

Figure 5A:
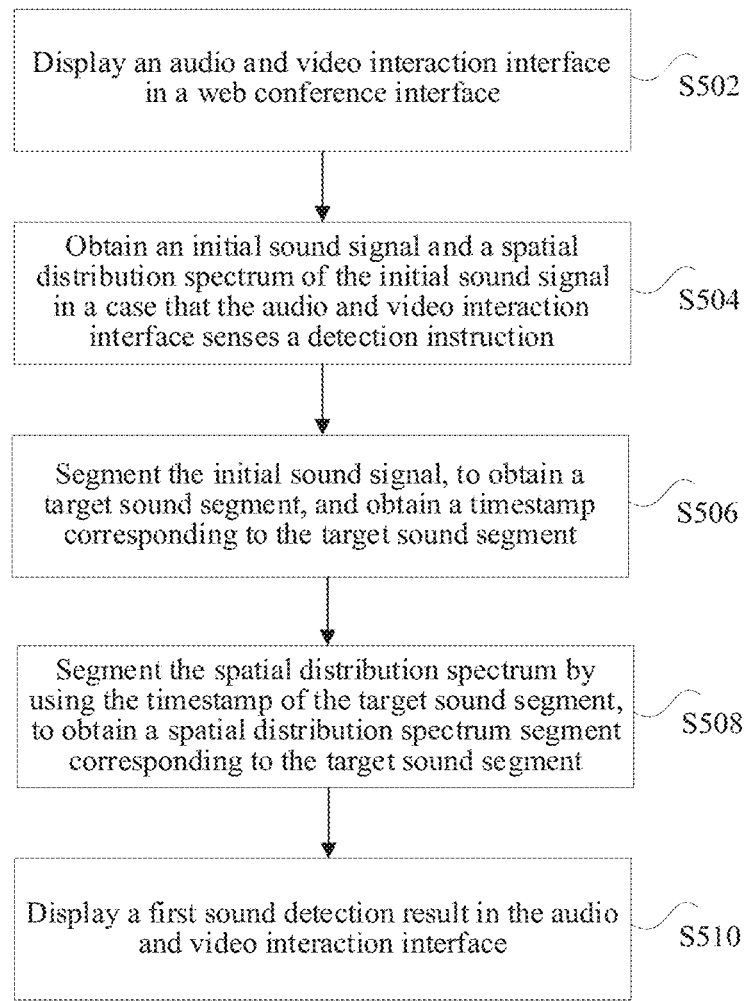
FIG. 5a is a flowchart of another sound detection method according to some embodiments of the present disclosure.

FIG. 5a is a flowchart of a sound detection method according to some embodiments of the present disclosure. As shown in FIG. 5a, the method may include the following steps S502-S510.

In step S502, an audio and video interaction interface is displayed in a conference interface.

The conference interface may be a display interface of a computer terminal or a mobile terminal.

The audio and video interaction interface may be an interface displayed in a conference scenario in the conference interface.

The conference interface may be a web conference interface or may be a conference interface displayed by using a cable.

In step S504, an initial sound signal and a spatial distribution spectrum of the initial sound signal are obtained in response to the audio and video interaction interface sensing a detection instruction.

In some embodiments, a user may press a preset control to trigger the detection instruction, to obtain the initial sound signal and the spatial distribution spectrum of the initial sound signal.

In step S506, the initial sound signal is segmented, to obtain a target sound segment, and obtain a timestamp corresponding to the target sound segment.

The target sound segment includes a speech of at least one object, and the timestamp is used for indicating a start time of the target sound segment and an end time of the target sound segment.

In step S508, the spatial distribution spectrum is segmented by using the timestamp of the target sound segment, to obtain a spatial distribution spectrum segment corresponding to the target sound segment.

In step S510, a first sound detection result is displayed in the audio and video interaction interface.

The first sound detection result is a result obtained by inputting the target sound segment and the spatial distribution spectrum segment into a sound detection model, and the first sound detection result is used for describing whether sound of multiple objects exists in the initial sound signal.

In some embodiments, the first sound detection result may be displayed in the audio and video interaction interface, so that the initial sound signal with the overlapping speech is processed according to the first sound detection result, to obtain a speech of each object in the initial sound signal.

In some embodiments of the present disclosure, after the displaying the first sound detection result in the audio and video interaction interface, the method further includes: separating the sound of the multiple objects in the initial sound signal in response to the first sound detection result indicating that the sound of the multiple objects exists in the initial sound signal, to obtain an independent sound signal of each of the objects; and displaying the independent sound signal of each of the objects in the audio and video interaction interface.

Figure 5B:
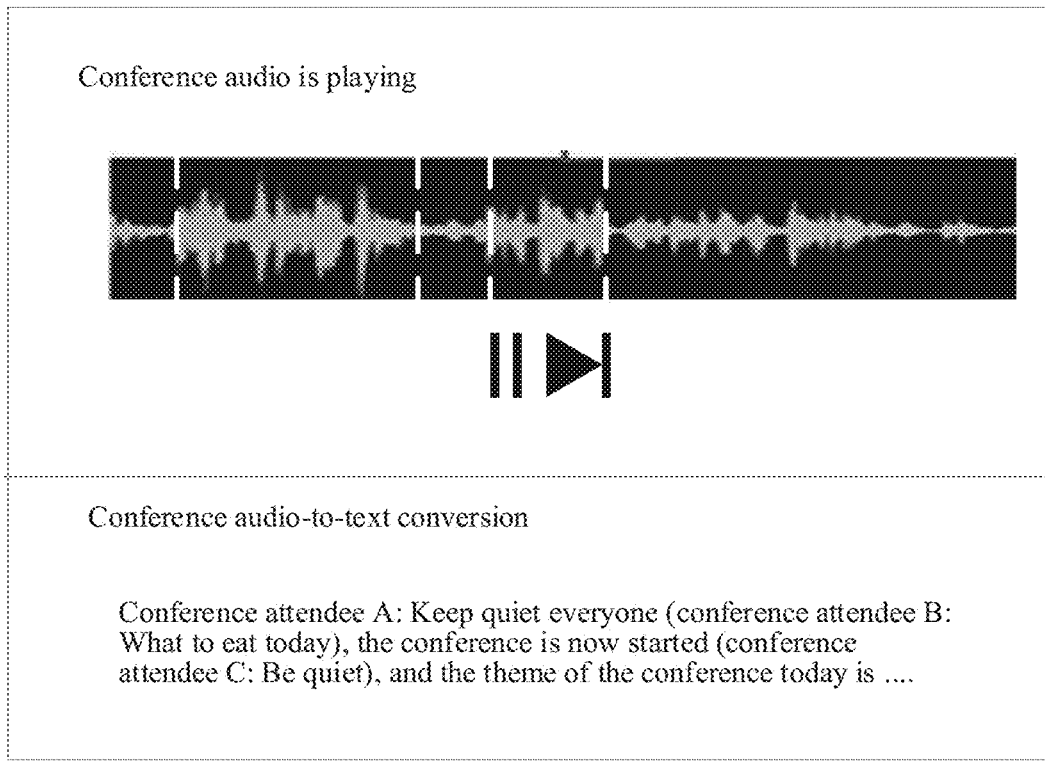
FIG. 5b is a schematic diagram of a display surface according to some embodiments of the present disclosure.

FIG. 5b shows a conference audio playing interface. The conference audio playing interface may display the first sound detection result. The first sound detection result may display an initial sound signal of a conference attendee A. A part between first two segmenting lines is a first part in the initial sound signal in which both a speech of the conference attendee A and a speech of a conference attendee B exist, and a part between the latter two segmenting lines is a second part in the initial sound signal in which both a speech of the conference attendee A and a speech of a conference attendee C exist.

Further, sound in the first part and sound in the second part may be separated, to obtain an independent sound signal of the conference attendee A and an independent sound signal of the conference attendee B in the first part, and to obtain an independent sound signal of the conference attendee A and an independent sound signal of the conference attendee C in the second part.

Further, text conversion may be performed on a sound signal of the conference attendee A and the independent sound signal of the conference attendee A in the initial sound signal, to obtain the text of the conference attendee A, that is, "keep quiet everyone, the conference is now started, and the theme for the conference today is . . . ." Text conversion may be performed on the independent sound signal of the conference attendee B in the initial sound signal, to obtain a text of the conference attendee B, that is, "what to eat today." Text conversion may be performed on the independent sound signal of the conference attendee C in the initial sound signal, to obtain a text of the conference attendee C, that is, "be quiet."

Further, the text information of the conference attendee B and the text information of the conference attendee C may further be recorded at a corresponding position of the text information of the conference attendee A according to the independent sound signals of the conference attendee B and the conference attendee C in the initial sound signal.

In some embodiments of the present disclosure, the segmenting the initial sound signal, to obtain the target sound segment includes: processing the initial sound signal by using the spatial distribution spectrum, to obtain the target sound signal; and segmenting the target sound signal, to obtain the target sound segment.

It should be noted that the exemplary implementation solution in the foregoing embodiments of the present disclosure has the same solution, the application scenario, and the implementation process provided in the above embodiments, but is not limited to the solution provided in the above embodiments.

According to some embodiments of the present disclosure, an example of a sound detection method is further provided. It should be noted that, steps shown in flowcharts of the accompanying drawings may be performed in a computer system such as a group of computer executable instructions. In addition, although logic sequences are shown in the flowcharts, in some cases, the shown or described steps may be performed in sequences different from those herein.

Figure 6A:
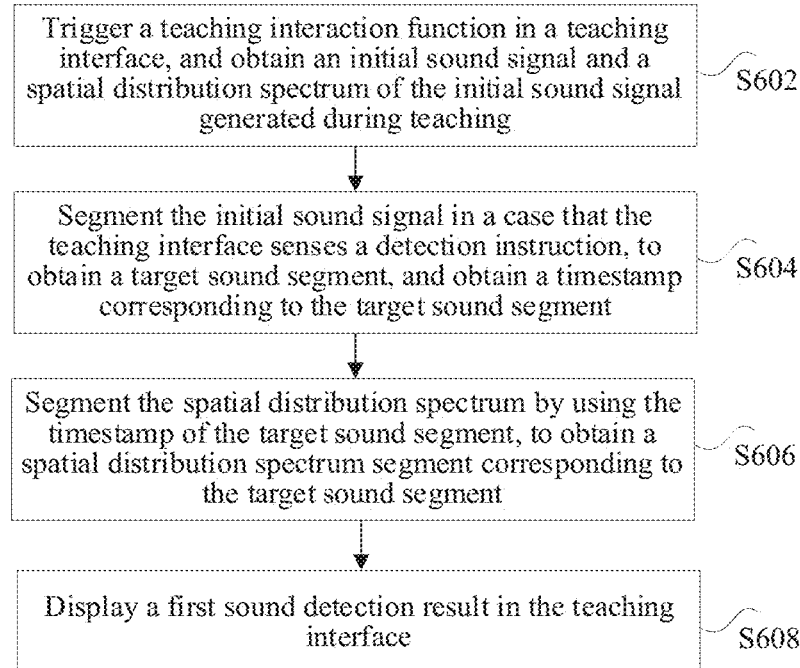
FIG. 6a is a flowchart of another sound detection method according to some embodiments of the present disclosure.

FIG. 6a is a flowchart of a sound detection method according to some embodiments of the present disclosure. As shown in FIG. 6a, the method may include the following steps.

In step S602, a teaching interaction function is triggered in a teaching interface, to obtain an initial sound signal and a spatial distribution spectrum of the initial sound signal generated during teaching.

The aforementioned teaching interface may be a teaching video interface of a mobile terminal or a computer terminal.

The teaching interaction function may be interaction and communication between a student and a teacher. Specifically, the communication may involve speech.

In some embodiments, after a teaching interaction function is triggered in the teaching interface, an initial sound signal and a spatial distribution spectrum of the initial sound signal generated during teaching may be obtained.

In step S604, the initial sound signal is segmented in response to the teaching interface sensing a detection instruction, to obtain a target sound segment, and obtain a timestamp corresponding to the target sound segment.

The target sound segment includes a speech of at least one object, and the timestamp is used for indicating a start time of the target sound segment and an end time of the target sound segment.

In step S606, the spatial distribution spectrum is segmented by using the timestamp of the target sound segment, to obtain a spatial distribution spectrum segment corresponding to the target sound segment.

In step S608, a first sound detection result is displayed in the teaching interface.

The first sound detection result is a result obtained by inputting the target sound segment and the spatial distribution spectrum segment into a sound detection model, and the first sound detection result is used for describing whether sound of multiple objects exists in the initial sound signal.

In some embodiments, a first sound detection result may be displayed in the teaching interface, so that the initial sound signal with the overlapping speech is processed according to the first sound detection result, to obtain a speech of each object in the initial sound signal.

In this example of the present disclosure, in response to the first sound detection result indicating that sound of multiple objects exists in the initial sound signal, the method further includes: displaying target speech signals of the multiple objects in the teaching interface, where the target speech signal is obtained by segmenting the sound of the multiple objects in the initial sound signal.

Figure 6B:
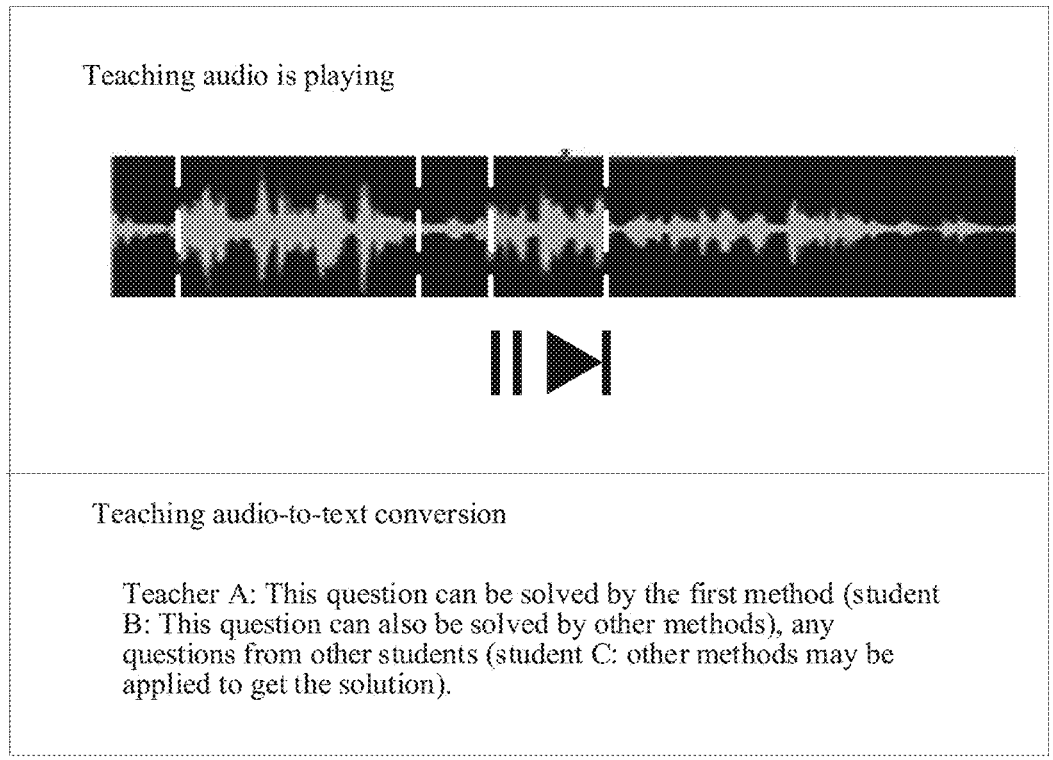
FIG. 6b is a schematic diagram of another display surface according to some embodiments of the present disclosure.

FIG. 6b shows a teaching audio playing interface. The first sound detection result may be displayed in the teaching audio playing interface. An initial sound signal of a teacher A, a student B, and a student C may be displayed in the first sound detection result. A part between first two segmenting lines is a first part in the initial sound signal in which both a speech of the teacher A and a speech of the student B exist, and a part between the latter two segmenting lines is a second part in the initial sound signal in which both a speech of the teacher A and a speech of a student C exist.

Further, sound in the first part and sound in the second part may be separated, to obtain an independent sound signal of the teacher A and an independent sound signal of the student B in the first part and an independent sound signal of the teacher A and an independent sound signal of the student C in the second part.

Further, text conversion may be performed on a sound signal of the teacher A and the independent sound signal of the teacher A in the initial sound signal, to obtain a text of the teacher A, that is, "this question can be solved by the first method, any questions from other students?" Text conversion may be performed on the independent sound signal of the student B in the initial sound signal, to obtain a text of the student B, that is, "this question can also be solved by other methods." Text conversion may be performed on the independent sound signal of the student C in the initial sound signal, to obtain a text of the student C, that is, "other methods may be applied to get the solution."

Further, the text information of the student B and the text information of the student C may further be recorded at a corresponding position of the text information of the teacher A according to the independent sound signals of the student B and the student C in the initial sound signal.

In some embodiments of the present disclosure, the segmenting the initial sound signal in response to a detection instruction sensed by the teaching interface, to obtain a target sound segment includes: processing the initial sound signal by using the spatial distribution spectrum in response to the detection instruction sensed by the teaching interface, to obtain a target sound signal; and segmenting the target sound signal, to obtain the target sound segment.

It should be noted that the exemplary implementation solution in the foregoing embodiments of the present disclosure has the same solution and the implementation process provided in the above embodiments, but is not limited to the solution provided in the above embodiments.

Figure 7:
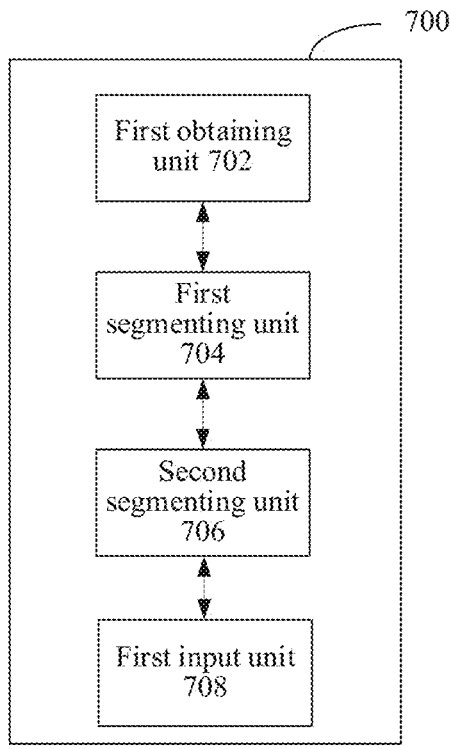
FIG. 7 is a schematic diagram of a sound detection apparatus according to some embodiments of the present disclosure.

According to some embodiments of the present disclosure, an example of a sound detection apparatus for performing the foregoing sound detection method is further provided. As shown in FIG. 7, the apparatus 700 includes: a first obtaining unit 702, a first segmenting unit 704, a second segmenting unit 706, and a first input unit 708.

The first obtaining unit is configured to obtain an initial sound signal and a spatial distribution spectrum of the initial sound signal. The first segmenting unit is configured to segment the initial sound signal, to obtain a target sound segment, and obtain a timestamp corresponding to the target sound segment. The target sound segment includes a speech of at least one object, and the timestamp is used for indicating a start time of the target sound segment and an end time of the target sound segment. The second segmenting unit is configured to segment the spatial distribution spectrum by using the timestamp, to obtain a spatial distribution spectrum segment corresponding to the target sound segment. The first input unit is configured to input the target sound segment and the spatial distribution spectrum segment into a sound detection model, to obtain a first sound detection result. The first sound detection result is used for describing whether sound of multiple objects exists in the initial sound signal.

It should be noted herein that, the first obtaining unit 702, the first segmenting unit 704, the second segmenting unit 706, and the first input unit 708 correspond to step S202 to step S208 described above. The example and the application scenario implemented by the four units are the same as those implemented by corresponding steps, but are not limited to the content disclosed above. It should be noted that the foregoing modules may be run on the computer terminal 10 described above.

In this some embodiments, the first obtaining unit includes: a first obtaining module and a first positioning module.

The first obtaining module is configured to obtain the initial sound signal. The first positioning module is configured to position the initial sound signal by using a sound source positioning module, to generate the spatial distribution spectrum of the initial sound signal.

In some embodiments, the first segmenting unit includes: a first processing module and a first segmenting module.

The first processing module is configured to process the initial sound signal by using the spatial distribution spectrum, to obtain a target sound signal. The first segmenting module is configured to segment the target sound signal, to obtain the target sound segment.

In some embodiments of the present disclosure, the first processing module includes: a first processing submodule and a second processing submodule.

The first processing submodule is configured to process the initial sound signal by using a sound enhancement module, to obtain an enhanced initial sound signal. The second processing submodule is configured to process the enhanced initial sound signal by using the spatial distribution spectrum, to obtain the target sound signal.

In some embodiments of the present disclosure, the apparatus includes: a second obtaining unit and a first training unit.

The first obtaining unit is configured to obtain a first sample and a second sample. The first sample is a sample sound segment, and the second sample is a sample spatial distribution spectrum segment corresponding to the sample sound segment. The first training unit is configured to train an initial model by using the first sample and the second sample, to obtain the sound detection model.

In some embodiments of the present disclosure, the first training unit includes: a second input module, a third input module, a first fusing module, and a first training module.

The second input module is configured to input the first sample into a first feature extraction network, to obtain a sample sound feature vector. The third input module is configured to input the second sample into a second feature extraction network, to obtain a sample spatial distribution feature vector. The first fusing module is configured to fuse the sample sound feature vector and the sample spatial distribution feature vector, to obtain a first target feature vector. The first training module is configured to train the initial model by using the first target feature vector, to obtain the sound detection model.

In some embodiments of the present disclosure, the apparatus further includes: a third segmenting unit and a second input unit.

The third segmenting unit is configured to segment the initial sound signal by using the timestamp of the target sound segment, to obtain an initial sound segment. The second input unit is configured to input the target sound segment, the initial sound segment, and the spatial distribution spectrum segment into the sound detection model, to obtain a second sound detection result. The second sound detection result is used for describing whether multiple objects exist in the initial sound signal.

In some embodiments of the present disclosure, the first training module includes: a first obtaining submodule and a first training submodule.

The first obtaining submodule is configured to obtain a third sample. The third sample is a sample initial sound segment corresponding to the sample sound segment. The first training submodule is configured to train the initial model by using the first sample, the second sample, and the third sample, to obtain the sound detection model.

In some embodiments of the present disclosure, the first training module includes: a first input submodule, a first fusing submodule, and a second training submodule.

The first input submodule is configured to input the third sample into a third feature extraction network, to obtain a sample initial sound feature vector. The first fusing submodule is configured to fuse the first target feature vector and the initial sound feature vector, to obtain a second target feature vector. The second training submodule is configured to train the initial model by using the second target feature vector, to obtain the sound detection model.

Figure 8:
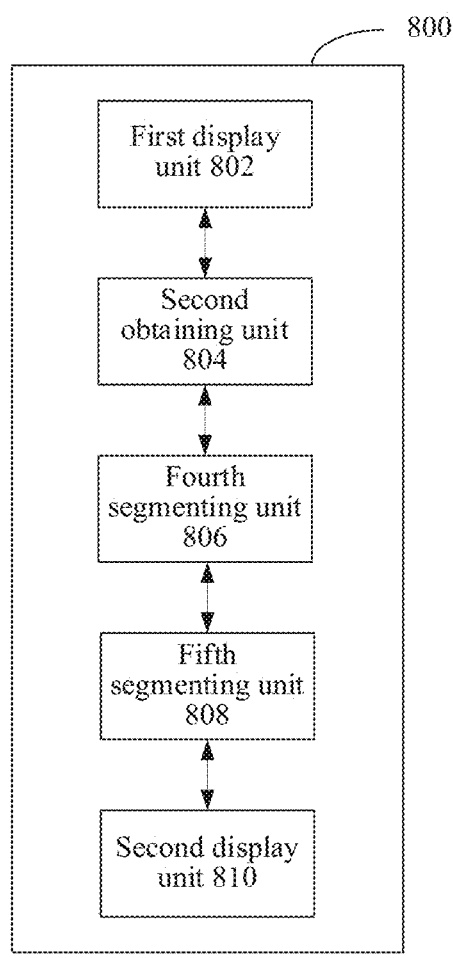
FIG. 8 is a schematic diagram of another sound detection apparatus according to some embodiments of the present disclosure.

According to some embodiments of the present disclosure, an example of a sound detection apparatus for performing the foregoing sound detection method is further provided. As shown in FIG. 8, the apparatus 800 includes: a first display unit 802, a second obtaining unit 804, a fourth segmenting unit 806, a fifth segmenting unit 808, and a second display unit 810.

The first display unit is configured to display an audio and video interaction interface in a conference interface. The second obtaining unit is configured to obtain an initial sound signal and a spatial distribution spectrum of the initial sound signal in response to the audio and video interaction interface sensing a detection instruction. The fourth segmenting unit is configured to segment the initial sound signal, to obtain a target sound segment, and obtain a timestamp corresponding to the target sound segment. The target sound segment includes a speech of at least one object, and the timestamp is used for indicating a start time of the target sound segment and an end time of the target sound segment. The fifth segmenting unit is configured to segment the spatial distribution spectrum by using the timestamp of the target sound segment, to obtain a spatial distribution spectrum segment corresponding to the target sound segment. The second display unit is configured to display a first sound detection result in the audio and video interaction interface. The first sound detection result is a result obtained by inputting the target sound segment and spatial distribution spectrum segment into a sound detection model, and the first sound detection result is used for describing whether sound of multiple objects exists in the initial sound signal.

It should be noted herein that, the first display unit 802, the second obtaining unit 804, the fourth segmenting unit 806, the fifth segmenting unit 808, and the second display unit 810 correspond to step S502 to step S510 in the above embodiments. The example and the application scenario implemented by each unit are the same as those of the corresponding step, but are not limited to the content disclosed in the above embodiments. It should be noted that the foregoing units may be run on the computer terminal 10 provided in some embodiments as a part of the apparatus.

In some embodiments of the present disclosure, the fourth segmenting unit includes: a fourth processing module and a second segmenting module.

The fourth processing module is configured to process the initial sound signal by using the spatial distribution spectrum, to obtain a target sound signal. The second segmenting module is configured to segment the target sound signal, to obtain the target sound segment.

In some embodiments of the present disclosure, the apparatus further includes: a first separation unit and a third display unit.

The first separation unit is configured to separate the sound of the multiple objects in the initial sound signal in response to the first sound detection result indicating that the sound of the multiple objects exists in the initial sound signal, to obtain an independent sound signal of each of the objects. The third display unit is configured to display the independent sound signal of each of the objects in the audio and video interaction interface.

It should be noted that the exemplary implementation solution in the foregoing embodiments of the present disclosure has the same solution, the application scenario, and the implementation process provided in the above embodiments, but is not limited to the solution provided in the above embodiments.

Figure 9:
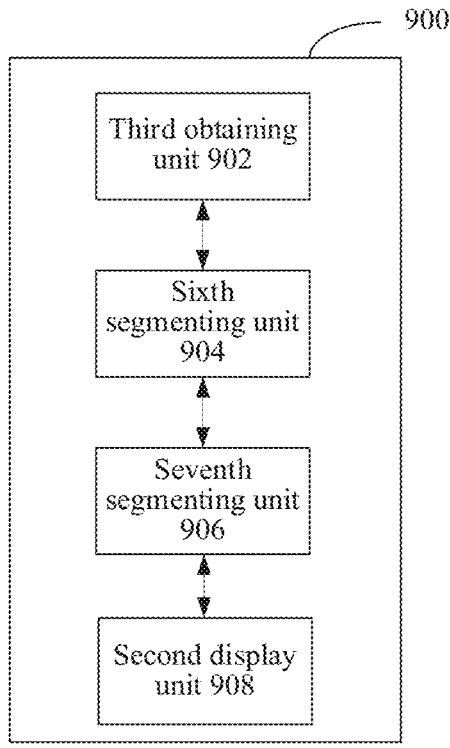
FIG. 9 is a schematic diagram of another sound detection apparatus according to some embodiments of the present disclosure.

According to some embodiments of the present disclosure, an example of a sound detection apparatus for performing the foregoing sound detection method is further provided. As shown in FIG. 9, the apparatus 900 includes: a third obtaining unit 902, a sixth segmenting unit 904, a seventh segmenting unit 906, and a second display unit 908.

The third obtaining unit is configured to trigger a teaching interaction function in a teaching interface, and obtain an initial sound signal and a spatial distribution spectrum of the initial sound signal generated during teaching. The sixth segmenting unit is configured to segment the initial sound signal in response to the teaching interface sensing a detection instruction, to obtain a target sound segment, and obtain a timestamp corresponding to the target sound segment. The target sound segment includes a speech of at least one object, and the timestamp is used for indicating a start time of the target sound segment and an end time of the target sound segment. The seventh segmenting unit is configured to segment the spatial distribution spectrum by using the timestamp of the target sound segment, to obtain a spatial distribution spectrum segment corresponding to the target sound segment. The second display unit is configured to display a first sound detection result in the teaching interface. The first sound detection result is a result obtained by inputting the target sound segment and the spatial distribution spectrum segment into a sound detection model, and the first sound detection result is used for describing whether sound of multiple objects exists in the initial sound signal.

It should be noted herein that, the third obtaining unit 902, the sixth segmenting unit 904, the seventh segmenting unit 906, and the second display unit 908 correspond to step S602 to step S608 in the above embodiments. The example and the application scenario implemented by each unit are the same as those of the corresponding step, but are not limited to the content disclosed in the above embodiments. It should be noted that the foregoing units may be run on the computer terminal 10 provided in the some embodiments as a part of the apparatus.

In some embodiments of the present disclosure, the sixth segmenting unit includes: a fifth processing module and a third segmenting module.

The fifth processing module is configured to process the initial sound signal by using the spatial distribution spectrum in response to a detection instruction sensed by the teaching interface, to obtain a target sound signal. The third segmenting module is configured to segment the target sound signal, to obtain the target sound segment.

In some embodiments of the present disclosure, the apparatus further includes: a second separation unit and a fourth display unit.

The second separation unit is configured to separate the sound of the multiple objects in the initial sound signal in response to the first sound detection result being that the sound of the multiple objects exists in the initial sound signal, to obtain an independent sound signal of each of the objects. The fourth display unit is configured to display the independent sound signal of each of the objects in the teaching interface.

It should be noted that the exemplary implementation solution in the foregoing embodiments of the present disclosure has the same solution, the application scenario, and the implementation process provided in the above embodiments, but is not limited to the solution provided in the above embodiments.

According to some embodiments of the present disclosure, an example of a sound detection system is further provided. The sound detection system includes one or more processors and a memory. The memory is connected to the processor(s) and configured to store computer instructions. The one or more processors are configured to execute the computer instructions to cause the sound detection system to perform: obtain an initial sound signal and a spatial distribution spectrum of the initial sound signal; segment the initial sound signal, to obtain a target sound segment, and obtain a timestamp corresponding to the target sound segment, where the target sound segment includes a speech of at least one object, and the timestamp is used for indicating a start time of the target sound segment and an end time of the target sound segment; segment the spatial distribution spectrum by using the timestamp, to obtain a spatial distribution spectrum segment corresponding to the target sound segment; and input the target sound segment and the spatial distribution spectrum segment into a sound detection model, to obtain a first sound detection result, where the first sound detection result is used for describing whether sound of multiple objects exists in the initial sound signal. In other words, the computer instructions being executable by the one or more processors to cause the sound detection system to perform the sound detection method provided in the foregoing embodiments.

It should be noted that the exemplary implementation solution in the foregoing embodiments of the present disclosure has the same solution, the application scenario, and the implementation process provided in the above embodiments, but is not limited to the solution provided in the above embodiments.

Some embodiments of the present disclosure may further provide a computer terminal. The computer terminal may be any computer terminal device in a computer terminal cluster. Optionally, in some embodiments, the computer terminal may be replaced with a terminal device such as a mobile terminal.

Optionally, in some embodiments, the computer terminal may be located in at least one of multiple network devices in a computer network.

In some embodiments, the computer terminal may execute program codes of the following steps in the sound detection method: obtaining an initial sound signal and a spatial distribution spectrum of the initial sound signal; segmenting the initial sound signal, to obtain a target sound segment, and obtaining a timestamp corresponding to the target sound segment, where the target sound segment includes a speech of at least one object, and the timestamp is used for indicating a start time of the target sound segment and an end time of the target sound segment; segmenting the spatial distribution spectrum by using the timestamp, to obtain a spatial distribution spectrum segment corresponding to the target sound segment; and inputting the target sound segment and the spatial distribution spectrum segment into a sound detection model, to obtain a first sound detection result, where the first sound detection result is used for describing whether sound of multiple objects exists in the initial sound signal.

Figure 10:
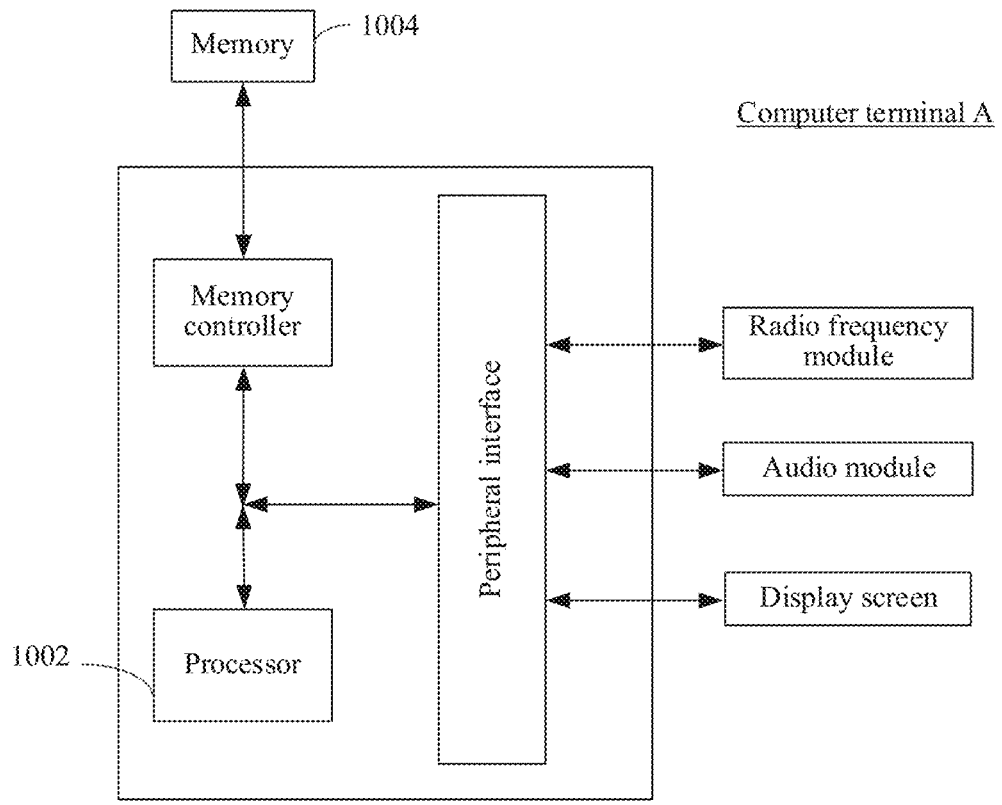
FIG. 10 is a structural block diagram of a computer terminal according to some embodiments of the present disclosure.

Optionally, FIG. 10 is a structural block diagram of a computer terminal according to some embodiments of the present disclosure. As shown in FIG. 10, the computer terminal A may include: one or more (only one shown in the figure) processors 1002 and a memory 1004.

The memory may be configured to store a software program and a module, for example, the program instruction/module corresponding to the sound detection method and apparatus in the embodiments of the present disclosure. The processor performs various functional applications and data processing, that is, implementing the foregoing sound detection method by running the software program and the module stored in the memory. The memory may include a high-speed random-access memory, and may also include a nonvolatile memory, for example, one or more magnetic storage apparatuses, flash memories, or other nonvolatile solid-state memories. In some embodiments, the memory may further include memories remotely disposed relative to the processor, and these remote memories may be connected to the terminal A through a network. Examples of the network include, but are not limited to, the Internet, an intranet, a local area network, a mobile communication network, and a combination thereof.

The processor may call, by using a transmission apparatus, the information and the application program that are stored in the memory, to perform the following steps: obtaining an initial sound signal and a spatial distribution spectrum of the initial sound signal; segmenting the initial sound signal, to obtain a target sound segment, and obtaining a timestamp corresponding to the target sound segment, where the target sound segment includes a speech of at least one object, and the timestamp is used for indicating a start time of the target sound segment and an end time of the target sound segment; segmenting the spatial distribution spectrum by using the timestamp, to obtain a spatial distribution spectrum segment corresponding to the target sound segment; and inputting the target sound segment and the spatial distribution spectrum segment into a sound detection model, to obtain a first sound detection result, where the first sound detection result is used for describing whether sound of multiple objects exists in the initial sound signal.

Optionally, the processor may further execute program codes of the following steps: obtaining the initial sound signal; and positioning the initial sound signal by using a sound source positioning module, to generate the spatial distribution spectrum of the initial sound signal.

Optionally, the processor may further execute program codes of the following steps: processing the initial sound signal by using the spatial distribution spectrum, to obtain a target sound signal; and segmenting the target sound signal, to obtain the target sound segment.

Optionally, the processor may further execute program codes of the following steps: processing the initial sound signal by using a sound enhancement module, to obtain an enhanced initial sound signal; and processing the enhanced initial sound signal by using the spatial distribution spectrum, to obtain the target sound signal.

Optionally, the processor may further execute program codes of the following steps: obtaining a first sample and a second sample, where the first sample is a sample sound segment, and the second sample is a sample spatial distribution spectrum segment corresponding to the sample sound segment; and training an initial model by using the first sample and the second sample, to obtain the sound detection model.

Optionally, the processor may further execute program codes of the following steps: inputting the first sample into a first feature extraction network, to obtain a sample sound feature vector; inputting the second sample into a second feature extraction network, to obtain a sample spatial distribution feature vector; fusing the sample sound feature vector and the sample spatial distribution feature vector, to obtain a first target feature vector; and training the initial model by using the first target feature vector, to obtain the sound detection model.

Optionally, the processor may further execute program codes of the following steps: segmenting the initial sound signal by using the timestamp of the target sound segment, to obtain an initial sound segment; and inputting the target sound segment, the initial sound segment, and the spatial distribution spectrum segment into the sound detection model, to obtain a second sound detection result, where the second sound detection result is used for describing whether multiple objects exist in the initial sound signal.

Optionally, the processor may further execute program codes of the following steps: obtaining a third sample, where the third sample is a sample initial sound segment corresponding to the sample sound segment; and training the initial model by using the first sample, the second sample, and the third sample, to obtain the sound detection model.

Optionally, the processor may further execute program codes of the following steps: inputting the third sample into a third feature extraction network, to obtain a sample initial sound feature vector; fusing the first target feature vector and the sample initial sound feature vector, to obtain a second target feature vector; and training the initial model by using the second target feature vector, to obtain the sound detection model.

A person of ordinary skill in the art may understand that the structure shown in FIG. 10 is merely an example, and the computer terminal may be a terminal device such as a smartphone (e.g., an Android mobile phone, an iOS mobile phone, etc.), a tablet computer, a palmtop computer, a Mobile Internet Device (MID), and a PAD. FIG. 10 does not constitute a limitation on the structure of the electronic apparatus. For example, the computer terminal A may further include more or fewer components (e.g., a network interface, a display apparatus, etc.) than those shown in FIG. 10, or have a configuration different from that shown in FIG. 10.

A person of ordinary skill in the art may understand that all or some steps of the methods in the foregoing embodiments may be implemented by a program instructing relevant hardware of the terminal device. The program may be stored in a transitory or non-transitory computer-readable storage medium. The storage medium may include a flash disk, a read-only memory (ROM), a random-access memory (RAM), a magnetic disk, an optical disc, and the like.

Some embodiments of the present disclosure further provide a transitory or non-transitory computer-readable storage medium. Optionally, in some embodiments, the storage medium may be configured to store program codes executed in the sound detection method provided in the foregoing embodiments. In other words, the storage medium may store one or more computer instructions executable by one or more processors to cause a device to perform the sound detection method provided in the foregoing embodiments.

Optionally, in some embodiments, the storage medium may be located in any computer terminal in a computer terminal cluster in a computer network, or in any mobile terminal in a mobile terminal cluster.

Optionally, the storage medium is further configured to store program codes used to execute the following step: obtaining an initial sound signal and a spatial distribution spectrum of the initial sound signal; segmenting the initial sound signal, to obtain a target sound segment, and obtaining a timestamp corresponding to the target sound segment, where the target sound segment includes a speech of at least one object, and the timestamp is used for indicating a start time of the target sound segment and an end time of the target sound segment; segmenting the spatial distribution spectrum by using the timestamp, to obtain a spatial distribution spectrum segment corresponding to the target sound segment; and inputting the target sound segment and the spatial distribution spectrum segment into a sound detection model, to obtain a first sound detection result, where the first sound detection result is used for describing whether sound of multiple objects exists in the initial sound signal.

Optionally, the storage medium is further configured to store program codes used to execute the following step: obtaining the initial sound signal; and positioning the initial sound signal by using a sound source positioning module, to generate the spatial distribution spectrum of the initial sound signal.

Optionally, the storage medium is further configured to store program codes used to execute the following step: processing the initial sound signal by using the spatial distribution spectrum, to obtain a target sound signal; and segmenting the target sound signal, to obtain the target sound segment.

Optionally, the storage medium is further configured to store program codes used to execute the following step: processing the initial sound signal by using a sound enhancement module, to obtain an enhanced initial sound signal; and processing the enhanced initial sound signal by using the spatial distribution spectrum, to obtain the target sound signal.

Optionally, the storage medium is further configured to store program codes used to execute the following step: obtaining a first sample and a second sample, where the first sample is a sample sound segment, and the second sample is a sample spatial distribution spectrum segment corresponding to the sample sound segment; and training an initial model by using the first sample and the second sample, to obtain the sound detection model.

Optionally, the storage medium is further configured to store program codes used to execute the following step: inputting the first sample into a first feature extraction network, to obtain a sample sound feature vector; inputting the second sample into a second feature extraction network, to obtain a sample spatial distribution feature vector; fusing the sample sound feature vector and the sample spatial distribution feature vector, to obtain a first target feature vector; and training the initial model by using the first target feature vector, to obtain the sound detection model.

Optionally, the storage medium is further configured to store program codes used to execute the following step: segmenting the initial sound signal by using the timestamp of the target sound segment, to obtain an initial sound segment; and inputting the target sound segment, the initial sound segment, and the spatial distribution spectrum segment into the sound detection model, to obtain a second sound detection result, where the second sound detection result is used for describing whether multiple objects exist in the initial sound signal.

Optionally, the storage medium is further configured to store program codes used to execute the following step: obtaining a third sample, where the third sample is a sample initial sound segment corresponding to the sample sound segment; and training the initial model by using the first sample, the second sample, and the third sample, to obtain the sound detection model.

Optionally, the storage medium is further configured to store program codes used to execute the following step: inputting the third sample into a third feature extraction network, to obtain a sample initial sound feature vector; fusing the first target feature vector and the sample initial sound feature vector, to obtain a second target feature vector; and training the initial model by using the second target feature vector, to obtain the sound detection model.

The sequence numbers of the foregoing embodiments of the present disclosure are merely for description purposes, and are not intended to indicate the preference among the embodiments.

In the foregoing embodiments of the present disclosure, descriptions of the embodiments have respective focuses. As for parts that are not described in detail in one embodiment, reference may be made to the relevant descriptions of the other embodiments.

In the several embodiments provided in the present disclosure, it should be understood that the disclosed technical content may be implemented in other manners. The described apparatus embodiments are merely exemplary. For example, the partition of the units is merely the partition based on the logical function and may be otherwise partitioned during actual implementation. For example, multiple units or components may be combined or integrated into another system, or some features may be omitted or not performed. In addition, the coupling, or direct coupling, or communication connection between the shown or discussed components may also be the indirect coupling or communication connection by means of some interfaces, units, or modules, and may be in electrical or other forms.

The units described as separate components may or may not be physically separated, and components shown as units may or may not be physical units, may be located in one location, or may be distributed in multiple network units. Some or all units may be selected according to actual requirements to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such understanding, the technical solutions of the present disclosure essentially, or the part contributing to the related technology, or all or part of the technical solutions may be represented in a form of a software product. The computer software product is stored in a storage medium and includes several instructions for instructing one computer device (which may be a personal computer, a server, or a network device) to perform all or some of the steps of the methods in the embodiments of the present disclosure. The above storage medium includes any medium that can store program codes, such as a Universal Serial Bus (USB) flash disk, a read-only memory (ROM), a random-access memory (RAM), a removable hard disk, a magnetic disk, or an optical disc.

The foregoing descriptions are merely exemplary implementations of the present disclosure. A person of ordinary skill in the art may make some improvements and modifications without departing from the principle of the present disclosure and the improvements and modifications shall fall within the protection scope of the present disclosure.

What is claimed is:

1. A sound detection method, comprising:
   obtaining an initial sound signal and a spatial distribution spectrum of the initial sound signal;
   segmenting the initial sound signal to obtain a target sound segment;
   obtaining a timestamp corresponding to the target sound segment, wherein the target sound segment comprises a speech of at least one object, and the timestamp is used for indicating a start time of the target sound segment and an end time of the target sound segment;
   segmenting the spatial distribution spectrum by using the timestamp, to obtain a spatial distribution spectrum segment corresponding to the target sound segment; and
   inputting the target sound segment and the spatial distribution spectrum segment into a sound detection model, to obtain a first sound detection result, wherein the first sound detection result is used for describing whether sound of a plurality of objects exists in the initial sound signal.

2. The sound detection method of claim 1, wherein the obtaining the initial sound signal and the spatial distribution spectrum of the initial sound signal comprises:
   obtaining the initial sound signal; and
   positioning the initial sound signal by using a sound source positioning module, to generate the spatial distribution spectrum of the initial sound signal.

3. The sound detection method of claim 1, wherein the segmenting the initial sound signal, to obtain the target sound segment comprises:
   processing the initial sound signal by using the spatial distribution spectrum, to obtain a target sound signal; and
   segmenting the target sound signal, to obtain the target sound segment.

4. The sound detection method of claim 3, wherein the processing the initial sound signal by using the spatial distribution spectrum, to obtain the target sound signal comprises:
   processing the initial sound signal by using a sound enhancement module, to obtain an enhanced initial sound signal; and
   processing the enhanced initial sound signal by using the spatial distribution spectrum, to obtain the target sound signal.

5. The sound detection method of claim 1, further comprising: obtaining the sound detection model through training;
   wherein the obtaining the sound detection model through training comprises:
   obtaining a first sample and a second sample, wherein the first sample is a sample sound segment, and the second sample is a sample spatial distribution spectrum segment corresponding to the sample sound segment; and
   training an initial model by using the first sample and the second sample, to obtain the sound detection model.

6. The sound detection method of claim 5, wherein the training the initial model by using the first sample and the second sample, to obtain the sound detection model comprises:
   inputting the first sample into a first feature extraction network, to obtain a sample sound feature vector;
   inputting the second sample into a second feature extraction network, to obtain a sample spatial distribution feature vector;
   fusing the sample sound feature vector and the sample spatial distribution feature vector, to obtain a first target feature vector; and
   training the initial model by using the first target feature vector, to obtain the sound detection model.

7. The sound detection method of claim 6, further comprising:
   segmenting the initial sound signal by using the timestamp, to obtain an initial sound segment; and
   inputting the target sound segment, the initial sound segment, and the spatial distribution spectrum segment into the sound detection model, to obtain a second sound detection result, wherein the second sound detection result is used for describing whether the plurality of objects exist in the initial sound signal.

8. The sound detection method of claim 7, wherein the training the initial model by using the first sample and the second sample, to obtain the sound detection model comprises:
   obtaining a third sample, wherein the third sample is a sample initial sound segment corresponding to the sample sound segment; and
   training the initial model by using the first sample, the second sample, and the third sample, to obtain the sound detection model.

9. The sound detection method of claim 8, wherein the training the initial model by using the first target feature vector, to obtain the sound detection model comprises:
   inputting the third sample into a third feature extraction network, to obtain a sample initial sound feature vector;
   fusing the first target feature vector and the sample initial sound feature vector, to obtain a second target feature vector; and
   training the initial model by using the second target feature vector, to obtain the sound detection model.

10. The sound detection method of claim 1, further comprising:
    separating the sound of the plurality of objects in the initial sound signal in response to the first sound detection result indicating that the sound of the plurality of objects exists in the initial sound signal, to obtain an independent sound signal of each of the objects.

11. A sound detection system, comprising:
    a memory configured to store computer instructions; and
    one or more processors configured to execute the computer instructions to cause the sound detection system to perform:
    obtaining an initial sound signal and a spatial distribution spectrum of the initial sound signal;

segmenting the initial sound signal to obtain a target sound segment;
obtaining a timestamp corresponding to the target sound segment, wherein the target sound segment comprises a speech of at least one object, and the timestamp is used for indicating a start time of the target sound segment and an end time of the target sound segment;
segmenting the spatial distribution spectrum by using the timestamp, to obtain a spatial distribution spectrum segment corresponding to the target sound segment; and
inputting the target sound segment and the spatial distribution spectrum segment into a sound detection model, to obtain a first sound detection result, wherein the first sound detection result is used for describing whether sound of a plurality of objects exists in the initial sound signal.

12. A non-transitory computer-readable storage medium that stores computer instructions executable by one or more processors to cause a device to perform:
obtaining an initial sound signal and a spatial distribution spectrum of the initial sound signal;
segmenting the initial sound signal to obtain a target sound segment;
obtaining a timestamp corresponding to the target sound segment, wherein the target sound segment comprises a speech of at least one object, and the timestamp is used for indicating a start time of the target sound segment and an end time of the target sound segment;
segmenting the spatial distribution spectrum by using the timestamp, to obtain a spatial distribution spectrum segment corresponding to the target sound segment; and
inputting the target sound segment and the spatial distribution spectrum segment into a sound detection model, to obtain a first sound detection result, wherein the first sound detection result is used for describing whether sound of a plurality of objects exists in the initial sound signal.

13. The non-transitory computer-readable storage medium of claim 12, wherein the obtaining the initial sound signal and the spatial distribution spectrum of the initial sound signal comprises:
obtaining the initial sound signal; and
positioning the initial sound signal by using a sound source positioning module, to generate the spatial distribution spectrum of the initial sound signal.

14. The non-transitory computer-readable storage medium of claim 12, wherein the segmenting the initial sound signal, to obtain the target sound segment comprises:
processing the initial sound signal by using the spatial distribution spectrum, to obtain a target sound signal; and
segmenting the target sound signal, to obtain the target sound segment.

15. The non-transitory computer-readable storage medium of claim 14, wherein the processing the initial sound signal by using the spatial distribution spectrum, to obtain the target sound signal comprises:
processing the initial sound signal by using a sound enhancement module, to obtain an enhanced initial sound signal; and
processing the enhanced initial sound signal by using the spatial distribution spectrum, to obtain the target sound signal.

16. The non-transitory computer-readable storage medium of claim 12, wherein the computer instructions are executable by the one or more processors to cause the device to further perform:
obtaining the sound detection model through training by:
obtaining a first sample and a second sample, wherein the first sample is a sample sound segment, and the second sample is a sample spatial distribution spectrum segment corresponding to the sample sound segment; and
training an initial model by using the first sample and the second sample, to obtain the sound detection model.

17. The non-transitory computer-readable storage medium of claim 16, wherein the training the initial model by using the first sample and the second sample, to obtain the sound detection model comprises:
inputting the first sample into a first feature extraction network, to obtain a sample sound feature vector;
inputting the second sample into a second feature extraction network, to obtain a sample spatial distribution feature vector;
fusing the sample sound feature vector and the sample spatial distribution feature vector, to obtain a first target feature vector; and
training the initial model by using the first target feature vector, to obtain the sound detection model.

18. The non-transitory computer-readable storage medium of claim 17, wherein the computer instructions are executable by the one or more processors to cause the device to further perform:
segmenting the initial sound signal by using the timestamp, to obtain an initial sound segment; and
inputting the target sound segment, the initial sound segment, and the spatial distribution spectrum segment into the sound detection model, to obtain a second sound detection result, wherein the second sound detection result is used for describing whether the plurality of objects exist in the initial sound signal.

19. The non-transitory computer-readable storage medium of claim 18, wherein the training the initial model by using the first sample and the second sample, to obtain the sound detection model comprises:
obtaining a third sample, wherein the third sample is a sample initial sound segment corresponding to the sample sound segment; and
training the initial model by using the first sample, the second sample, and the third sample, to obtain the sound detection model.

20. The non-transitory computer-readable storage medium of claim 19, wherein the training the initial model by using the first target feature vector, to obtain the sound detection model comprises:
inputting the third sample into a third feature extraction network, to obtain a sample initial sound feature vector;
fusing the first target feature vector and the sample initial sound feature vector, to obtain a second target feature vector; and
training the initial model by using the second target feature vector, to obtain the sound detection model.

* * * * *